Patented Sept. 29, 1925.

1,555,736

UNITED STATES PATENT OFFICE.

SALEM CHAS. WILSON, OF SPRINGFIELD, MISSOURI, ASSIGNOR OF ONE-HALF TO J. A. CULPEPPER, OF EMINENCE, MISSOURI.

COMPOSITION FOR TREATMENT OF METALS.

No Drawing. Application filed August 16, 1923. Serial No. 657,824.

*To all whom it may concern:*

Be it known that I, SALEM CHAS. WILSON, a citizen of the United States, residing at Springfield, in the county of Greene and State of Missouri, have invented new and useful Improvements in Composition for Treatment of Metals, of which the following is a specification.

This invention is directed to a composition of matter constituting an improved and efficient preparation for the treatment of metal to effect case hardening.

One of the fundamental purposes of this invention resides in the production of a preparation which, when applied to iron or similar metals, imparts thereto the properties of steel.

Another object of this invention is to produce a preparation which, when applied to a heated metal, such as iron, renders it case hardened, and thus permits metals of this type to be quickly, cheaply, and expeditiously conditioned for case hardened use.

Many efforts have been made to effect a case hardening of iron cheaply, expeditiously, and without the necessity of expensive equipment, but with more or less scant success, and it was to the end, that case hardening of iron and the production of a steel like article could be accomplished by the employment of an inexpensive compound under varied conditions, and as effectively by the ordinary blacksmith as in large furnaces and iron-working establishments, that I employ the compound forming the subject-matter of this invention.

The composition I employ to effect case hardening of ordinary iron consists of a mixture of silica, iron, manganese, lime, flint, and fusible organic matter. While it may be desirable to vary these proportions according to the size, quality, etc., of the iron, I have obtained excellent results from a mixture as follows:

| | |
|---|---:|
| Iron | 2.60 |
| Silica | 39.25 |
| Manganese | 31.05 |
| Organic matter | 8.40 |
| Undetermined | 18.70 |

To impart properties of steel to ordinary sheet, bolt, or cast iron, the metal to be treated is heated in an ordinary forge, electric furnace, or in any suitable manner, to a high red heat, whereupon the above compound, mixed as aforesaid, is applied so as to completely cover the metal to be treated. When covered in this manner by the compound, the iron is maintained at a high red heat for a period of from one to three minutes, after which it may be quenched or cooled as desired and according to the particular requirements.

I have produced by the above method a high grade chisel from ordinary bar iron. Likewise, I have easily and quickly effected the case hardening of roller bearings and the like.

It is obvious that by the employment of the compound forming the subject-matter of this invention, case hardening of ordinary iron and the production of case-hardened steel may be easily, quickly, and cheaply accomplished under a great variety of conditions, and, for instance, by a blacksmith with an ordinary forge, as well as in factories by the use of an electric furnace.

Although in the foregoing, certain proportions have been specified, it is to be understood that these proportions may be modified or varied without departing from or sacrificing any of the principles of this invention.

Having thus described my invention, and without enumerating variations and equivalents, what I desire protected by Letters Patent is as set forth in the following claims:

1. A composition of matter for effecting the case hardening of iron consisting of silica, iron, manganese, lime, flint, and fusible organic matter mixed in predetermined proportions.

2. A composition of matter for effecting the case hardening of iron consisting of iron 2.60, silica 39.25, manganese 31.05, organic and undetermined matter 27.10.

SALEM CHAS. WILSON.